(12) United States Patent
Wunderlich et al.

(10) Patent No.: US 7,323,517 B2
(45) Date of Patent: Jan. 29, 2008

(54) COMPOSITION AND PROCESS FOR ENHANCING CONTROLLED FREE RADICAL POLYMERIZATION

(75) Inventors: Wiebke Wunderlich, Bologna (IT); Rudolf Pfaendner, Rimbach (DE)

(73) Assignee: Ciba Specialty Chemicals Corp, Tarrytown, NY (US)

( * ) Notice: Subject to any disclaimer, the term of this patent is extended or adjusted under 35 U.S.C. 154(b) by 119 days.

(21) Appl. No.: 11/299,470

(22) Filed: Dec. 12, 2005

(65) Prior Publication Data

US 2006/0094828 A1    May 4, 2006

Related U.S. Application Data

(62) Division of application No. 10/381,223, filed as application No. PCT/EP01/10782 on Sep. 18, 2001, now Pat. No. 7,074,860.

(30) Foreign Application Priority Data

Sep. 25, 2000    (EP) .................................. 00810880

(51) Int. Cl.
*C08F 293/00*    (2006.01)

(52) U.S. Cl. ...................... 525/273; 525/314; 526/204; 526/217; 526/220; 526/328; 526/328.5; 526/329.2; 526/329.3; 526/346

(58) Field of Classification Search ................ 526/204, 526/220, 217, 328, 328.5, 329.2, 329.3, 346; 525/273, 314
See application file for complete search history.

(56) References Cited

U.S. PATENT DOCUMENTS

| | | | |
|---|---|---|---|
| 4,581,429 A | 4/1986 | Solomon et al. | 526/220 |
| 5,322,912 A | 6/1994 | Georges et al. | 526/204 |
| 5,354,800 A | 10/1994 | Suzuki et al. | 524/460 |
| 5,556,734 A | 9/1996 | Yamachika et al. | 430/270.1 |
| 5,610,249 A | 3/1997 | Ogawa | 526/193 |
| 5,852,074 A | 12/1998 | Tsutsumi et al. | 523/161 |
| 5,990,255 A | 11/1999 | Priddy et al. | 526/193 |
| 6,218,447 B1 | 4/2001 | Sugaya et al. | 523/201 |
| 6,255,422 B1 | 7/2001 | Bertin et al. | 526/220 |
| 6,353,107 B1 | 3/2002 | Kramer et al. | 546/216 |
| 6,395,953 B1 | 5/2002 | Koga et al. | 585/833 |
| 6,479,608 B1 | 11/2002 | Nesvadba et al. | 526/328.5 |
| 6,518,326 B1 | 2/2003 | Nesvadba et al. | 522/12 |
| 6,713,552 B1 | 3/2004 | Lesko et al. | 524/549 |
| 6,716,948 B1 | 4/2004 | Klaerner et al. | 526/303.1 |
| 6,815,500 B1 | 11/2004 | Boutillier | 525/71 |
| 2001/0000256 A1 | 4/2001 | Bertin et al. | 526/220 |

FOREIGN PATENT DOCUMENTS

| | | |
|---|---|---|
| EP | 0735052 | 10/1996 |
| EP | 0844256 | 10/1996 |
| EP | 0759039 | 2/1997 |
| GB | 2335190 | 9/1999 |
| GB | 2342649 | 4/2000 |
| WO | 96/18663 | 6/1996 |
| WO | 96/24620 | 8/1996 |
| WO | 97/36944 | 10/1997 |
| WO | 98/13392 | 4/1998 |
| WO | 98/30601 | 7/1998 |
| WO | 98/44008 | 10/1998 |
| WO | 99/47575 | 9/1999 |
| WO | 00/14135 | 3/2000 |
| WO | 00/34345 | 6/2000 |
| WO | 01/09204 | 2/2001 |

OTHER PUBLICATIONS

Encycl. Polym. Sci., vol. 3, (1985), pp. 288-290.
C. A. Barson, Compr. Pol. Sci., (1989), 13, pp. 171-183.
J. Brandrup et al., Polymer Handbook, Third Edition, pp. 81, 133-141.
G. Moad et al., The Chemistry of Free Radical Polymerization, 1995, pp. 234-251.

*Primary Examiner*—Bernard Lipman
(74) *Attorney, Agent, or Firm*—Tyler A. Stevenson

(57) ABSTRACT

The present invention relates to a composition and process for enhancing the controlled radical polymerization in the presence of nitroxyls and nitroxylethers by adding a chain transfer agent selected from the group consisting of mercaptanes, thioethers and disulfides to the polymerizable mixture. A further subject of the invention is the use of mercaptanes, thioethers and disulfides for increasing rate and yield of controlled radical polymerizations in the presence of a nitroxyl or a nitroxylether.

15 Claims, No Drawings

COMPOSITION AND PROCESS FOR ENHANCING CONTROLLED FREE RADICAL POLYMERIZATION

This is a divisional of application Ser. No. 10/381,223, filed Mar. 21, 2003, now U.S. Pat. No. 7,074,860, which is a 371 of PCT/EP01/10782, filed Sep. 18, 2001.

U.S. Pat. No. 4,581,429 to Solomon et al., issued Apr. 8, 1986, discloses a free radical polymerization process which controls the growth of polymer chains to produce short chain or oligomeric homopolymers and copolymers, including block and graft copolymers. This type of polymerization is frequently called "living polymerization". The process employs an initiator having the formula (in part) R'R"N—O—X, where X is a free radical species capable of polymerizing unsaturated monomers. The reactions typically have low conversion rates. Specifically mentioned radical R'R"N—O● groups are derived from 1,1,3,3 tetraethyl-isoin-doline, 1,1,3,3 tetrapropylisoindoline, 2,2,6,6 tetramethylpiperidine, 2,2,5,5 tetramethyl-pyrrolidine or di-t-butylamine.

U.S. Pat. No. 5,322,912 to Georges et al. issued Jun. 21, 1994 discloses a polymerization process using a free radical initiator, a polymerizable monomer compound and a stable free radical agent of the basic structure R'R"N—O● for the synthesis of homopolymers and block copolymers.

EP 0 759 039 to Georges et al. describes the improved polymerization of acrylates using 4-oxo-2,2,6,6-tetramethyl-1-piperidinyloxy free radical as stable free radical agent R'R"N—O●.

However, the suggested compounds do not fulfill all requirements. Particularly the polymerization of acrylates does not proceed fast enough and/or the monomer to polymer conversion is not as high as desired.

For this reason many attempts have been made in the last years to improve conversion rate whilst retaining the advantages of controlled polymerization such as for example low polydispersity and the capability of block copolymer formation. Many improvements have been made by modifying the chemical structure of the nitroxyl radical or of the nitroxyl ether.

WO 98/13392 for example describes open chain alkoxyamine compounds which have a symmetrical substitution pattern and are derived from NO gas or from nitroso compounds.

WO 96/24620 describes a polymerization process in which very specific stable free radical agents are used, such as for example

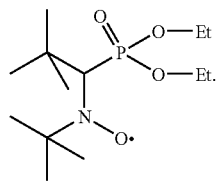

WO 98/30601 discloses specific nitroxyls based on imidazolidinons.

WO 98/44008 discloses specific nitroxyls based on morpholinones, piperazinones and piperazindiones.

Despite the above mentioned structural attempts to improve controlled radical polymerization reactions there is still a need for improving the polymerization process to obtain higher yields in shorter reaction times.

EP-A-735 052 for example discloses a method for preparing thermoplastic polymers of narrow polydispersitiy by free radical-initated polymerization, which comprises adding a free radical initiator, a stable free radical agent and a pyridinium tosylate to a styrene monomer, which enhances the reaction time and conversion rate of the polymerization.

Other accelerators such as phosphonic and sulfonic acids are described in WO 96/18663, phosphites are described in U.S. Pat. No. 5,610,249 and protonic acids are described in U.S. Pat. No. 5,322,912.

Surprisingly it has now been found that the rate of polymerization and conversion can be strongly improved by adding to the polymerizable mixture a chain transfer agent selected from the group consisting of a mercaptane, a thioether or a disulfide. Higher molecular weights are reached in shorter reaction times whilst polydispersity remains low and surprisingly the polymers can be completely reinitiated to form block copolymers. This is surprising, since one would expect that at least partially terminated polymers (not anymore "living" polymers) are formed.

Moreover when reinitiating a polymer, which has been prepared via controlled radical polymerization in the presence of a nitroxyl radical or a nitroxyl ether, to form block copolymers also a remarkable increase in rate and conversion of block copolymer formation is observed when said chain transfer agents are added to the block copolymerization step.

The low polydispersity which is characteristic for controlled radical polymerizations remains essentially unaffected by the addition of said chain transfer agents.

The polymerization processes and resin products of the present invention are useful in many applications, including a variety of specialty applications, such as for the preparation of block copolymers and/or graft copolymers which are useful as compatibilizing agents for polymer blends or dispersing agents for coating systems.

Polymers prepared by nitroxyl radical or nitroxyl ether mediated radical polymerization exhibit sometimes a yellow/brown color. Surprisingly it has been found that the presence of the chain transfer agent in the polymerizable composition is in many cases also beneficial for the color of the final polymer.

One subject of the present invention is a polymerizable composition, comprising a) at least one ethylenically unsaturated monomer or oligomer, and b1) at least one nitroxyl ether having the structural element

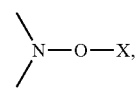

wherein

X represents a group having at least one carbon atom and is such that the free radical X● derived from X is capable of initiating polymerization of ethylenically unsaturated monomers; or b2) at least one stable free nitroxyl radical

and a free radical initiator and c) a chain transfer agent selected from the group consisting of a mercaptane, a thioether and a disulfide, with the proviso, that, if a stable free nitroxyl radical is present, the chain transfer agent is not a disulfide.

Also subject of the invention is a polymerizable composition, comprising a) a macroinitiator, which is a oligomer or polymer prepared in the presence of a nitroxyl radical or a nitroxyl ether and having attached to the oligomer/polymer backbone a nitroxyl group with the structural element

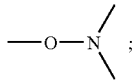

b) an ethylenically unsaturated monomer or oligomer and c) a chain transfer agent selected from the group consisting of a mercaptane, a thioether and a disulfide.

The macroinitiator can be prepared by polymerizing a monomer in the presence of a nitroxyl or nitroxyl ether or by grafting of an existing conventionally polymerized polymer with a nitroxyl ether or a nitroxyl radical, as described in EP-A-1 115 766 or EP-A-1 115 765.

An ethylenically unsaturated oligomer is for example a poloyethylenglykoldiacrylate or in general a oligomer which has been functionalized at the end groups. Such oligomers are known and largely items of commerce.

Preferably the ethylenically unsaturated monomer is selected from the group consisting of ethylene, propylene, n-butylene, i-butylene, styrene, substituted styrene, conjugated dienes, acrolein, vinyl acetate, vinylpyrrolidone, vinylimidazole, maleic anhydride, (alkyl)acrylic acidanhydrides, (alkyl)acrylic acid salts, (alkyl)acrylic esters, (alkyl) acrylonitriles, (alkyl)acrylamides, vinyl halides or vinylidene halides.

Preferably the ethylenically unsaturated monomer is a compound of formula $CH_2=C(R_a-(C=Z)-R_b$, wherein $R_a$ is hydrogen or $C_1$-$C_4$alkyl, $R_b$ is $NH_2$, $O^-(Me^+)$, glycidyl, unsubstituted $C_1$-$C_{18}$alkoxy, $C_2$-$C_{100}$alkoxy interrupted by at least one N and/or O atom, or hydroxy-substituted $C_1$-$C_{18}$alkoxy, unsubstituted $C_1$-$C_{18}$alkylamino, di($C_1$-$C_{18}$alkyl)amino, hydroxy-substituted $C_1$-$C_{18}$alkylamino or hydroxy-substituted di($C_1$-$C_{18}$alkyl)amino, —O—$CH_2$—$CH_2$—N($CH_3$)$_2$ or —O—$CH_2$—$CH_2$—$N^+H(CH_3)_2$ $An^-$;

$An^-$ is a anion of a monovalent organic or inorganic acid;

Me is a monovalent metal atom or the ammonium ion.

Z is oxygen or sulfur.

Examples of acids from which the anion $An^-$ is derived are $C_1$-$C_{12}$ carboxylic acids, organic sulfonic acids such as $CF_3SO_3H$ or $CH_3SO_3H$, mineralic acids such as HCl, HBr or HI, oxo acids such as $HClO_4$ or complex acids such as $HPF_6$ or $HBF_4$.

Examples for $R_a$ as $C_2$-$C_{100}$alkoxy interrupted by at least one O atom are of formula

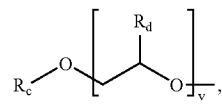

wherein $R_c$ is $C_1$-$C_{25}$alkyl, phenyl or phenyl substituted by $C_1$-$C_{18}$alkyl, $R_d$ is hydrogen or methyl and v is a number from 1 to 50. These monomers are for example derived from non ionic surfactants by acrylation of the corresponding alkoxylated alcohols or phenols. The repeating units may be derived from ethylene oxide, propylene oxide or mixtures of both.

Further examples of suitable acrylate or methacrylate monomers are given below.

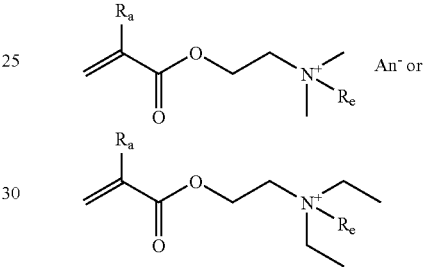

$An^-$, wherein $An^-$ and $R_a$ have the meaning as defined above and $R_e$ is methyl or benzyl. $An^-$ is preferably $Cl^-$, $Br^-$ or $^-O_3S$—$CH_3$.

Further acrylate monomers are

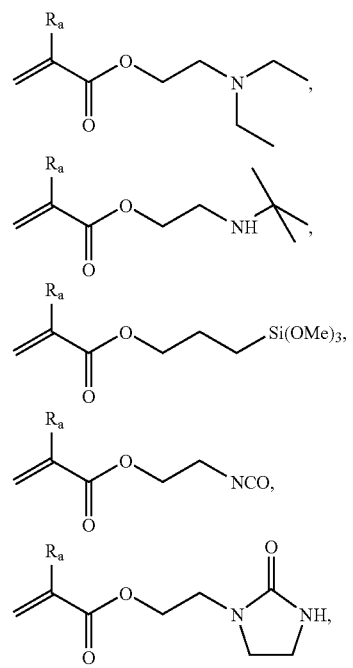

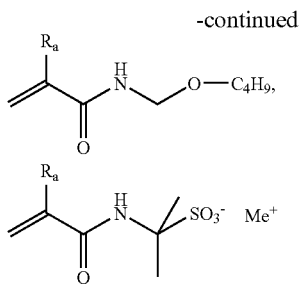

Examples for suitable monomers other than acrylates are

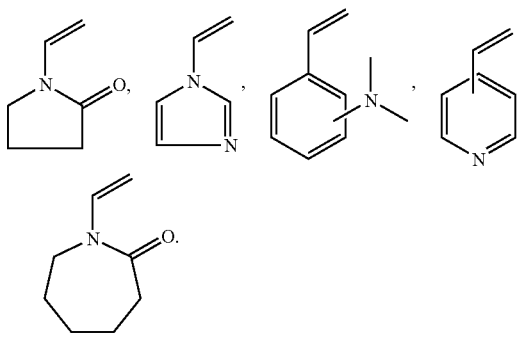

Preferably $R_a$ is hydrogen or methyl, $R_b$ is $NH_2$, gycidyl, unsubstituted or with hydroxy substituted $C_1$-$C_4$alkoxy, unsubstituted $C_1$-$C_4$alkylamino, di($C_1$-$C_4$alkyl)amino, hydroxy-substituted $C_1$-$C_4$alkylamino or hydroxy-substituted di($C_1$-$C_4$alkyl)amino; and Z is oxygen.

More preferred the ethylenically unsaturated monomer is an acrylic acid ester, acrylamide, acrylnitrile, methacrylic acid ester, methacrylamide, methacrylnitrile.

Acrylic acid esters and methacrylic acid esters are typically $C_1$-$C_{18}$alkyl esters.

Most preferred is n-butylacrylate, tert-butylacrylate, methylacrylate, ethylacrylate, propylacrylate, hexylacrylate and hydroxyethylacrylate.

The nitroxyl ethers and nitroxyl radicals are principally known from U.S. Pat. No. 4,581,429 or EP-A-621 878. Particularly useful are the open chain compounds described in WO 98/13392, WO 99/03894 and WO 00/07981, the piperidine derivatives described in WO 99/67298 and GB 2335190 or the heterocyclic compounds described in GB 2342649 and WO 96/24620. Preferably the nitroxyl ether of component b1) is of formula A, B or O,

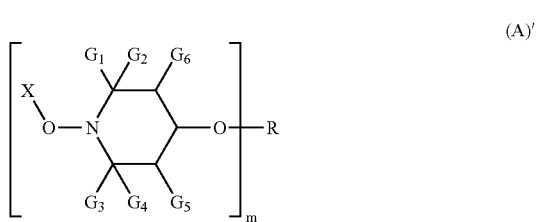

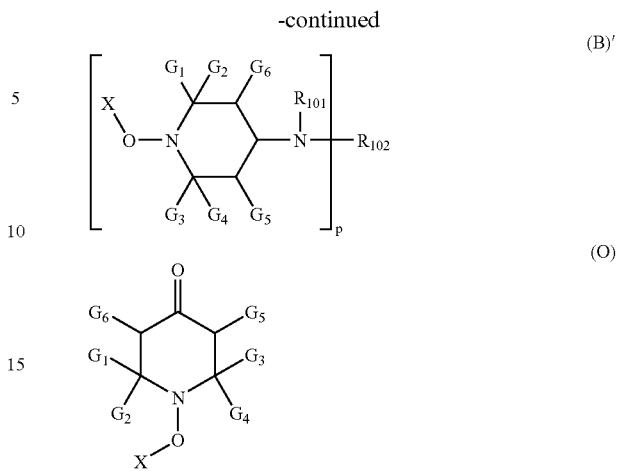

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_{101}$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$G_6$ is hydrogen and $G_5$ is hydrogen or $C_1$-$C_4$alkyl, $G_1$ and $G_3$ are methyl and $G_2$ and $G_4$ are ethyl or propyl or $G_1$ and $G_2$ are methyl and $G_3$ and $G_4$ are ethyl or propyl; and X is selected from the group consisting of —$CH_2$-phenyl, $CH_3CH$-phenyl, $(CH_3)_2C$-phenyl, $(C_5$-$C_6$cycloalkyl$)_2CCN$, $(CH_3)_2CCN$, —$CH_2CH=CH_2$, $CH_3CH—CH=CH_2$ ($C_1$-$C_4$alkyl)$CR_{20}$—C(O)-phenyl, ($C_1$-$C_4$)alkyl-$CR_{20}$—C(O)—($C_1$-$C_4$)alkoxy, ($C_1$-$C_4$)alkyl-$CR_{20}$—C(O)—($C_1$-$C_4$)alkyl, ($C_1$-$C_4$)alkyl-$CR_{20}$—C(O)—N-di($C_1$-$C_4$)alkyl, ($C_1$-$C_4$)alkyl-$CR_{20}$—C(O)—NH($C_1$-$C_4$)alkyl, ($C_1$-$C_4$)alkyl-$CR_{20}$—C(O)—$NH_2$, wherein $R_{20}$ is hydrogen or ($C_1$-$C_4$)alkyl.

More preferably in formula A, B and O

R is hydrogen, $C_1$-$C_{18}$alkyl, cyanoethyl, benzoyl, glycidyl, a monovalent radical of an aliphatic, carboxylic acid;

$R_{101}$ is $C_1$-$C_{12}$alkyl, $C_7$-$C_8$aralkyl, $C_2$-$C_{18}$alkanoyl, $C_3$-$C_5$alkenoyl or benzoyl;

$R_{102}$ is $C_1$-$C_{18}$alkyl, glycidyl, a group of the formula —$CH_2CH(OH)$-Z or of the formula —CO-Z, wherein Z is hydrogen, methyl or phenyl; and X is $CH_3$—CH-phenyl.

The above compounds and their preparation are described in GB 2335190.

Another preferred group of nitroxyl ethers of component b1) are those of formula (Ic), (Id), (Ie), (If), (Ig) or (Ih)

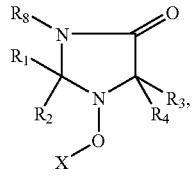
(Ic)

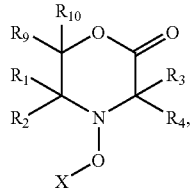
(Id)

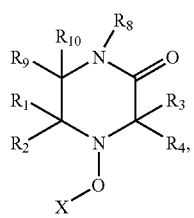
(Ie)

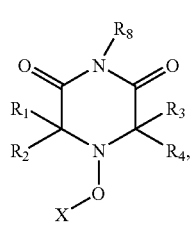
(If)

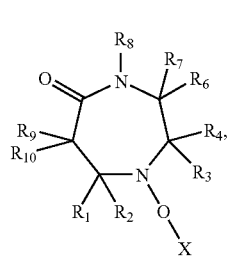
(Ig)

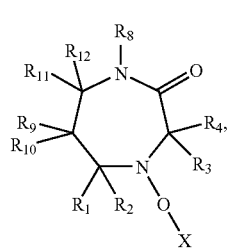
(Ih)

wherein $R_1$, $R_2$, $R_3$ and $R_4$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl or $R_1$ and $R_2$ and/or $R_3$ and $R_4$ together with the linking carbon atom form a $C_3$-$C_{12}$cycloalkyl radical;

$R_5$, $R_6$ and $R_7$ independently are hydrogen, $C_1$-$C_{18}$alkyl or $C_6$-$C_{10}$aryl;

$R_8$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl $C_7$-$C_9$phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl;

$R_9$, $R_{10}$, $R_{11}$, and $R_{12}$ are independently hydrogen, phenyl or $C_1$-$C_{18}$alkyl; and X is selected from the group consisting of —$CH_2$-phenyl, $CH_3CH$-phenyl, $(CH_3)_2C$-phenyl, $(C_5$-$C_6$cycloalkyl$)_2$CCN, $(CH_3)_2$CCN, —$CH_2CH$=$CH_2$, $CH_3CH$—CH=$CH_2$ ($C_1$-$C_4$alkyl)$CR_{20}$—C(O)-phenyl, $(C_1$-$C_4)$alkyl-$CR_{20}$—C(O)—$(C_1$-$C_4)$alkoxy, $(C_1$-$C_4)$alkyl-$CR_{20}$—C(O)—$(C_1$-$C_4)$alkyl, $(C_1$-$C_4)$alkyl-$CR_{20}$—C(O)—N-di$(C_1$-$C_4)$alkyl, $(C_1$-$C_4)$alkyl-$CR_{20}$—C(O)—NH$(C_1$-$C_4)$alkyl, $(C_1$-$C_4)$alkyl-$CR_{20}$—C(O)—$NH_2$, wherein $R_{20}$ is hydrogen or $(C_1$-$C_4)$alkyl.

More preferably in formula (Ic), (Id), (Ie), (f), (Ig) and (Ih) at least two of $R_1$, $R_2$, $R_3$ and $R_4$ are ethyl, propyl or butyl and the remaining are methyl; or $R_1$ and $R_2$ or $R_3$ and $R_4$ together with the linking carbon atom form a $C_5$-$C_6$cycloalkyl radical and one of the remaining substituents is ethyl, propyl or butyl.

Most preferably X is $CH_3CH$-phenyl.

The above compounds and their preparation is described in GB 2342649.

When a nitroxyl radical is used together with a free radical initiator, the nitroxyl radical of component b2) is preferably of formula A', B' or O',

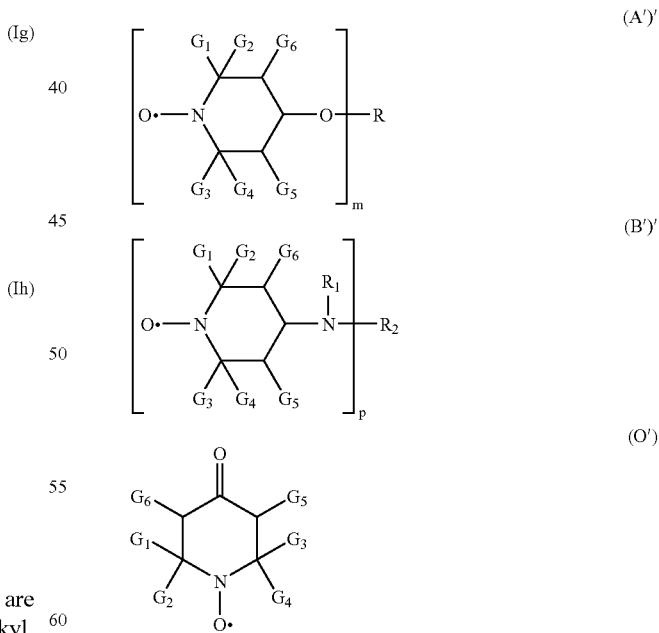

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_1$ is $C_1$-$C_{12}$alkyl, $C_5$-$C_7$cycloalkyl, $C_2$-$C_{18}$aralkyl, $C_2$-$C_8$alkanoyl, $C_3$-$C_5$alkenoyl or benzoyl;

$R_2$ is $C_1$-$C_{18}$alkyl, $C_5$-$C_7$alkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$G_6$ is hydrogen and $G_5$ is hydrogen or $C_1$-$C_4$alkyl, and $G_1$ and $G_3$ are methyl and $G_2$ and $G_4$ are ethyl or propyl or $G_1$ and $G_2$ are methyl and $G_3$ and $G_4$ are ethyl or propyl.

More preferably in formula A', B' and O'

R is hydrogen, $C_1$-$C_{18}$alkyl, cyanoethyl, benzoyl, glycidyl, a monovalent radical of an aliphatic, carboxylic acid;

$R_1$ is $C_1$-$C_{12}$alkyl, $C_7$-$C_8$aralkyl, $C_2$-$C_{18}$alkanoyl, $C_3$-$C_5$alkenoyl or benzoyl;

$R_2$ is $C_1$-$C_{18}$alkyl, glycidyl, a group of the formula —$CH_2CH(OH)$-Z or of the formula —CO-Z, wherein Z is hydrogen, methyl or phenyl.

The above compounds and their preparation are described in GB 2335190.

Another preferred group of nitroxyl radicals are those of formula (Ic'), (Id'), (Ie'), (If'), (Ig') or (Ih')

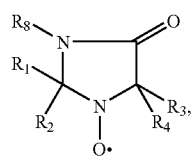
(Ic')

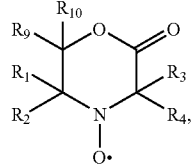
(Id')

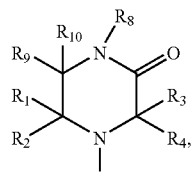
(Ie')

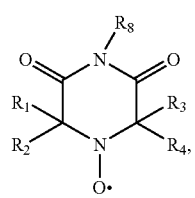
(If')

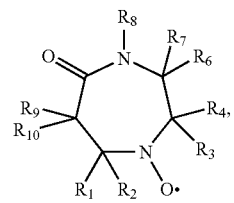
(Ig')

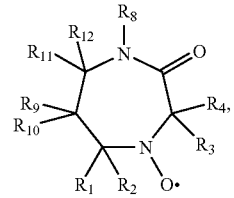
(Ih')

wherein $R_1$, $R_2$, $R_3$ and $R_4$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl or $R_1$ and $R_2$ and/or $R_3$ and $R_4$ together with the linking carbon atom form a $C_3$-$C_{12}$cycloalkyl radical;

$R_5$, $R_6$ and $R_7$ independently are hydrogen, $C_1$-$C_{18}$alkyl or $C_6$-$C_{10}$aryl;

$R_6$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl, $C_7$-$C_9$phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl; and $R_9$, $R_{10}$, $R_{11}$, and $R_{12}$ are independently hydrogen, phenyl or $C_1$-$C_{18}$alkyl.

More preferably in formula (Ic'), (Id'), (Ie'), (If'), (Ig') and (Ih') at least two of $R_1$, $R_2$, $R_3$ and $R_4$ are ethyl, propyl or butyl and the remaining are methyl; or $R_1$ and $R_2$ or $R_3$ and $R_4$ together with the linking carbon atom form a $C_5$-$C_6$cycloalkyl radical and one of the remaining substituents is ethyl, propyl or butyl.

The above compounds and their preparation is described in GB 2342649.

The structural element

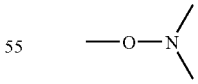

attached to the polymer backbone of the macroinitiator is preferably derived from a compound of formulae A, B, O (A', B', O') or of formulae Ic, Id, Ie, If, Ig, Ih (Ic', Id', Ie', If', Ig', Ih').

Further preferences given above for the nitroxyl ether and nitroxyl radical apply also for the nitroxyl moiety attached to the polymer backbone of the macroinitiator.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

Alkenyl with 3 to 18 carbon atoms is a linear or branched radical as for example propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl oder n-4-octadecenyl. Preferred is alkenyl with 3 bis 12, particularly preferred with 3 to 6 carbon atoms.

Alkinyl with 3 to 18 is a linear or branched radical as for example propinyl (—CH$_2$—C≡CH), 2-butinyl, 3-butinyl, n-2-octinyl, oder n-2-octadecinyl. Preferred is alkinyl with 3 to 12, particularly preferred with 3 to 6 carbon atoms.

Examples for hydroxy substituted alkyl are hydroxy propyl, hydroxy butyl or hydroxy hexyl.

Examples for halogen substituted alkyl are dichloropropyl, monobromobutyl or trichlorohexyl.

$C_2$-$C_{18}$alkyl interrupted by at least one O atom is for example —CH$_2$—CH$_2$—O—CH$_2$—CH$_3$, —CH$_2$—CH$_2$—O—CH$_3$— or —CH$_2$—CH$_2$—O—CH$_2$—CH$_2$—CH$_2$—O—CH$_2$—CH$_3$—. It is preferably derived from polyethlene glycol. A general description is —((CH$_2$)$_a$—O)$_b$—H/CH$_3$, wherein a is a number from 1 to 6 and b is a number from 2 to 10.

$C_2$-$C_{18}$alkyl interrupted by at least one NR$_5$ group may be generally described as —((CH$_2$)$_a$—NR$_5$)$_b$—H/CH$_3$, wherein a, b and R$_5$ are as defined above.

$C_3$-$C_{12}$cycloalkyl is typically, cyclopropyl, cyclopentyl, methylcyclopentyl, dimethylcyclopentyl, cyclohexyl, methylcyclohexyl or trimethylcyclohexyl.

$C_6$-$C_{10}$ aryl is for example phenyl or naphthyl, but also comprised are $C_1$-$C_4$alkyl substituted phenyl, $C_1$-$C_4$alkoxy substituted phenyl, hydroxy, halogen or nitro substituted phenyl. Examples for alkyl substituted phenyl are ethylbenzene, toluene, xylene and its isomers, mesitylene or isopropylbenzene. Halogen substituted phenyl is for example dichlorobenzene or bromotoluene.

Alkoxy substituents are typically methoxy, ethoxy, propoxy or butoxy and their corresponding isomers.

$C_7$-$C_9$phenylalkyl is benzyl, phenylethyl or phenylpropyl.

$C_5$-$C_{10}$heteroaryl is for example pyrrol, pyrazol, imidazol, 2,4, dimethylpyrrol, 1-methylpyrrol, thiophene, furane, furfural, indol, cumarone, oxazol, thiazol, isoxazol, isothiazol, triazol, pyridine, α-picoline, pyridazine, pyrazine or pyrimidine.

If R is a monovalent radical of a carboxylic acid, it is, for example, an acetyl, propionyl, butyryl, valeroyl, caproyl, stearoyl, lauroyl, acryloyl, methacryloyl, benzoyl, cinnamoyl or β-(3,5-di-tert-butyl-4-hydroxyphenyl)propionyl radical.)

$C_1$-$C_{18}$alkanoyl is for example, formyl, propionyl, butyryl, octanoyl, dodecanoyl but preferably acetyl and $C_3$-$C_5$alkenoyl is in particular acryloyl.

Particularly suitable nitroxyl ethers and nitroxyl radicals are those of formulae

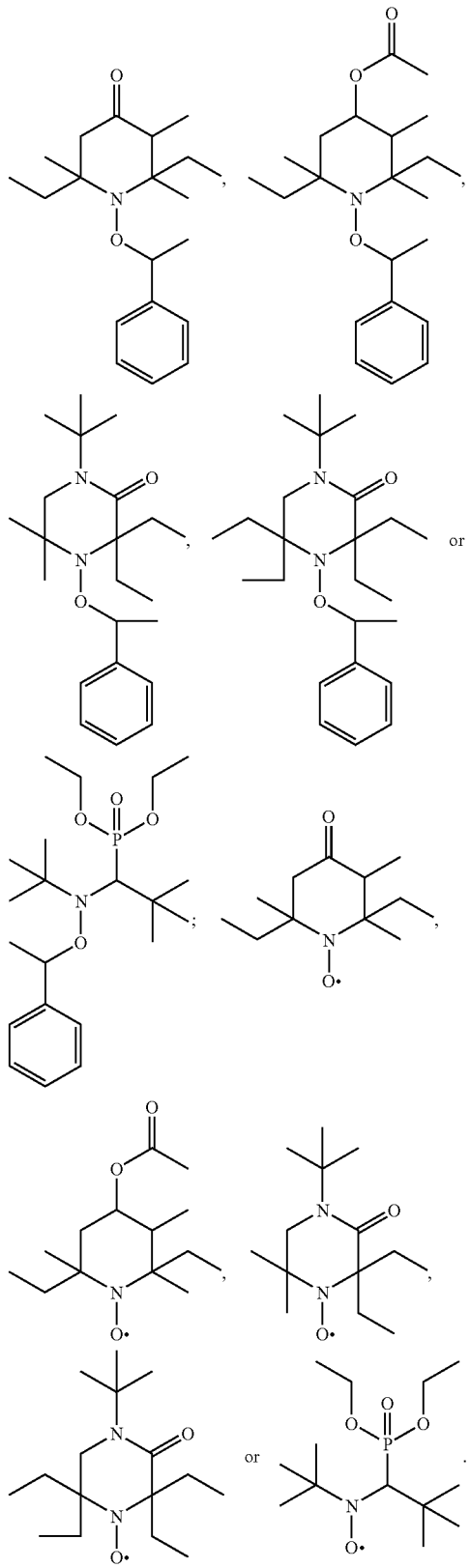

The free radical initiator of component b2) is preferably a bis-azo compound, a peroxide perester or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvale-ronitrile), 1,1'-azobis(1-cyclohexanecarbonitrile), 2,2'-azobis(isobutyramide) dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis(2-methyl-N-[1,1-bis(hydroxymethyl)-2-hydroxyethyl]propionamide; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis (2-methylbenzoyl) peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl perisobutyrate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis (t-butylperoxy) butane, 2,2 bis (t-butylperoxy) propane, dicumyl peroxide, 2,5-dimethylhexane-2,5-di-t-butylperoxide, 3-t-butylperoxy 3-phenylphthalide, di-t-amyl peroxide, α, α'-bis(t-butylperoxy isopropyl) benzene, 3,5-bis (t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

Azo initiators and peroxides are most preferred.

Preferably component c) is a compound of formula (IIa), (IIb) or (IIc)

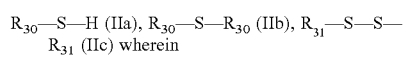
$R_{31}$ (IIc) wherein $R_{30}$ is $C_1$-$C_{18}$alkyl, $C_3$-$C_{18}$ alkenyl, $C_3$-$C_{18}$alkinyl, ($C_1$-$C_{18}$) alkyl-O—($C_1$-$C_{18}$alkylen)-, HO—($C_1$-$C_{18}$alkylen)-, ($C_1$-$C_{18}$alkyl)$_2$N—($C_1$-$C_{18}$alkylen)-, ($C_1$-$C_{18}$)alkyl-O—C(O)—($C_1$-$C_{18}$alkylen)-, phenyl, phenyl($C_1$-$C_3$alkyl), phenyl-C(O)— or ($C_1$-$C_{18}$alkyl)$_2$N—C(S)—; and $R_{31}$ is $C_1$-$C_{18}$alkyl, $C_3$-$C_{18}$ alkenyl, $C_3$-$C_{18}$alkinyl, ($C_1$-$C_{18}$) alkyl-O—($C_1$-$C_{18}$alkylen)-, HO—($C_1$-$C_{18}$alkylen)-.

Particularly preferred is a compound of formula (IIa), (IIb) or (IIc) wherein $R_{30}$ and $R_3$, is $C_1$-$C_{18}$alkyl.

Specific compounds are mercaptoethanol, dodecylmercaptane, dibenzylsufide, dibutyl-sulfide, octadecyldisulfide, distearylthiodipropionate (Irganox PS 802), dipalmityldithiodipropionate, dilaurylthiodipropionate (Irganox® PS 800).

More preferably component c) is of formula (IIa) and $R_{30}$ is $C_8$-$C_{18}$alkyl.

Most preferred is dodecylmercaptane.

Chain transfer agents are known and for example described in "The Chemistry of Free Radical Polymerization", Ed. G. Moad, E. Rizzardo, Pergamon 1995, pages 234-251. They are largely items of commerce.

In contrast to so called "iniferters" (initiator-transfer agent-terminator), chain transfer agents are not used alone without a radical initiator. They do not per se sufficiently initiate polymerization. A definition and examples for "iniferters" are given by T. Otsu, A. Matsumoto in Adv. Polym. Sci. 1998, 136, 75-137.

A further subject of the invention is a process for preparing an oligomer, a cooligomer, a polymer or a copolymer (block, random or graft) by free radical polymerization of at least one ethylenically unsaturated monomer or oligomer, which comprises (co)polymerizing the monomer or monomers/oligomers in the presence of b1) at least one nitroxyl ether having the structural element

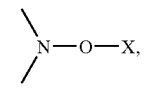

under reaction conditions capable of effecting scission of the O—X bond to form two free radicals, the radical •X being capable of initiating polymerization; or b2) at least one stable free nitroxyl radical

and a free radical initiator and c) a chain transfer agent selected from the group consisting of a mercaptane, a thioether and a disulfide, with the proviso, that, if a stable free nitroxyl radical is present, the chain transfer agent is not a disulfide.

Also subject of the invention is a process for preparing a block (co)polymer by free radical polymerization which comprises (co)polymerizing a) a macroinitiator, which is a oligomer or polymer prepared by radical polymerization in the presence of a nitroxyl radical or a nitroxyl ether and having attached to the oligomer/polymer backbone a nitroxyl group with the structural element

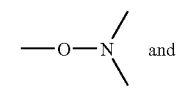 and b) an ethylenically unsaturated monomer or oligomer in the presence of c) a chain transfer agent selected from the group consisting of a mercaptane, a thioether and a disulfide; under reaction conditions capable of effecting scission of the O-polymer bond to form two free radicals, the polymer radical (macroinitiator) being capable of initiating polymerization.

Definitions and preferences for the components have already been given above.

Preferably the nitroxyl ether of component b1) or the nitroxyl radical of component b2) is present in an amount of from 0.001 mol-% to 20 mol-%, more preferably of from 0.002 mol-% to 10 mol-% and most preferably of from 0.005 mol-% to 5 mol-% based on the monomer or monomer mixture.

Preferably the free radical initiator is present in an amount of 0.001 mol-% to 20 mol-%, based on the monomer or monomer mixture.

The molar ratio of free radical initiator to stable free nitroxyl radical is preferably from 20:1 to 1:2, more preferably from 10:1 to 1:2.

Scission of the O—X bond or of the O-polymer bond of the nitroxyl ether or of the macroinitiator may be effected by ultrasonic treatment, radiation with actinic light or heating.

The scission of the O—X bond or of the O-polymer bond is preferably effected by heating and takes place at a temperature of between 50° C. and 180° C., more preferably from 80° C. to 145° C.

Preferably the chain transfer agent, component c), is present in an amount of from 0.001 mol-% to 0,5 mol-%, more preferably of from 0.001 mol-% to 0,3 mol-% and most preferably of from 0.001 mol-% to 0,25 mol-%, based on the monomer or monomer mixture.

The molar ratio of stable free nitroxyl radical or nitroxyl ether to chain transfer agent is preferably from 100:1 to 4:1.

After the polymerization step is completed the reaction mixture may be cooled down to a temperature below 60° C., preferably to room temperature. The polymer may be stored at this temperature without further reactions occuring.

The process may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

If organic solvents are used, suitable solvents or mixtures of solvents are typically pure alkanes (hexane, heptane, octane, isooctane), aromatic hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

The process is particularly useful for the preparation of block copolymers.

Block copolymers are, for example, block copolymers of polystyrene and polyacrylate (e.g., poly(styrene-co-acrylate) or poly(styrene-co-acrylate-co-styrene). They are useful as adhesives or as compatibilizers for polymer blends or as polymer toughening agents. Poly(methylmethacrylate-co-acrylate) diblock copolymers or poly(methylacrylate-co-acrylate-co-methacrylate) triblock copolymers) are useful as dispersing agents for coating systeme, as coating additives (e.g. rheological agents, compatibilizers, reactive diluents) or as resin component in coatings(e.g. high solid paints). Block copolymers of styrene, (meth)acrylates and/or acrylonitrile are useful as modifiers for plastics, elastomers and adhesives.

Furthermore, block copolymers of this invention, wherein the blocks alternate between polar monomers and non-polar monomers, are useful in many applications as amphiphilic surfactants or dispersants for preparing highly uniform polymer blends.

The (co)polymers of the present invention may have a number average molecular weight from 1 000 to 400 000 g/mol, preferably from 2 000 to 250 000 g/mol and, more preferably, from 2 000 to 200 000 g/mol. The number average molecular weight may be determined by size exclusion chromatography (SEC), matrix assisted laser desorption/ionization mass spectrometry (MALDI-MS) or, if the initiator carries a group which can be easily distinguished from the monomer(s), by NMR spectroscopy or other conventional methods.

The polymers or copolymers of the present invention have preferably a polydispersity of from 1.1 to 2, more preferably of from 1.2 to 1.8.

Thus, the present invention also encompasses in the synthesis novel block, multi-block, star, gradient, random, hyperbranched and dendritic copolymers, as well as graft copolymers.

The polymers prepared by the present invention are useful for following applications: adhesives, detergents, dispersants, emulsifiers, surfactants, defoamers, adhesion promoters, corrosion inhibitors, viscosity improvers, lubricants, rheology modifiers, thickeners, crosslinkers, paper treatment, water treatment, electronic materials, paints, coatings, photography, ink materials, imaging materials, superabsorbants, cosmetics, hair products, preservatives, biocide materials or modifiers for asphalt, leather, textiles, ceramics and wood.

The following examples illustrate the invention.

Compounds Used

The nitroxyl ether compound (101) and (102) are prepared according to GB 2335190

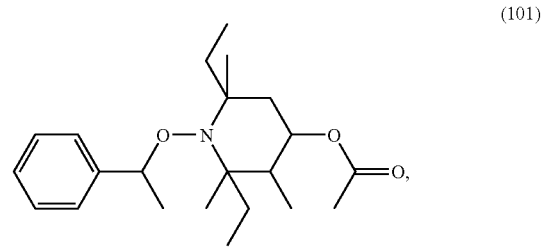

(101)

(102)

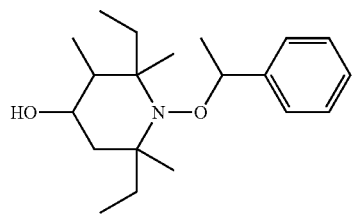

Compound 102 is the compound of example 7 in GB 2335190. Compound 101 is the 4-acetylester of compound 102 and can be prepared from compound 101 by standard methods.

n-butylacrylate and tert.-butylacrylate are commercially available for example from Merck. 1-dodecylmercaptane and ethylhexylthioglycolate are commercially available from Aldrich and WAKO.

EXAMPLES E1 to E3

In an evacuated Schlenk tube, flushed with argon and equipped with magnetic stirrer, the amount of nitroxyl ether and dodecylmercaptane given in Table 1 is added to 0.436 mol freshly distilled n-butylacrylate under an argon atmosphere. The Schlenk tube is closed and the remaining oxygen is removed in two freeze thaw cycles with liquid nitrogen. The tube is filled with argon and heated to 120° C. for 6 hours with stirring. The remaining monomer is removed under vacuum at room temperature. Drying is continued until constant weight of the residue. Molecular weight and distribution are determined using size exclusion chromatography with tetrahydrofurane and calibrated with polystyrene standards. The results are given in Table 1.

TABLE 1

Influence of dodecylmercaptane on controlled polymerization of n-butylacrylate

| sample no. | nitroxylether (101), mol % on monomer | dodecylmercaptane (mol %) on monomer | yield (%) | $M_n$ (calc) | $M_n$ | $M_w$ | $M_w/M_n$ |
|---|---|---|---|---|---|---|---|
| comparison V1 | 1 | — | 23 | 3300 | 3300 | 4500 | 1.36 |
| example E1 | 1 | 0.1 | 66 | 7100 | 8700 | 13100 | 1.5 |
| example E2 | 1 | 0.25 | 85 | 9100 | 10500 | 16800 | 1.6 |

Under the same polymerization conditions a significant increase in yield and molecular weight is observed, whereas the polydispersity (PD) remains low. The slight increase in polydispersity is due to the higher molecular weights achieved in examples E1 and E2.

Table 2 shows the result when the nitroxyl ether is partially substituted by the chain transfer agent.

TABELLE 2

Influence of partial substitution of the nitroxylether by dodecylmercaptane on controlled polymerization of n-butylacrylate.

| sample no. | nitroxylether (101), mol % on monomer | dodecylmercaptane (mol %) on monomer | yield (%) | $M_n$ (calc) | $M_n$ | $M_w$ | $M_w/M_n$ |
|---|---|---|---|---|---|---|---|
| comparison V1 | 1 | — | 23 | 3300 | 3300 | 4500 | 1.36 |
| E3 | 0.8 | 0.2 | 84 | 13500 | 11200 | 18200 | 1.62 |

A substitution of 20% nitroxyl ether by dodecylmercaptane leads to a significant increase in yield and polydispersity remains narrow.

Reinitiating Examples E5 and E6 Using Macroinitiators Prepared in the Presence of a Nitroxyl Ether and a Chain Transfer Agent 2.5 g of the polymers prepared as samples no. V1 and E1 (denoted in the following as macroinitiators, MI) and 7.5 g monomer are added to a Schlenk tube, flushed with argon and equipped with magnetic stirrer. The Schlenck reactor is closed and the remaining oxygen is removed in two freeze thaw cycles with liquid nitrogen. The tube is filled with argon and heated to 130° C. for 6 hours with stirring. The remaining monomer is removed under vacuum at room temperature. Drying is continued until constant weight of the residue. Molecular weight and distribution are determined using size exclusion chromatography with tetrahydrofurane and calibrated with polystyrene standards. The results are given in Table 3.

TABLE 3

Block copolymerization with n-butylacrylate and styrene

| sample | MI | $M_n$ (MI) | $M_w/M_n$ (MI) | monomer added | yield of added monomer (%) | $M_n$ | $M_w$ | $M_w/M_n$ |
|---|---|---|---|---|---|---|---|---|
| comparison V2 | V1 | 3300 | 1.36 | n-butylacrylate | 22 | 5600 | 7100 | 1.27 |
| E5 | E1 | 8700 | 1.50 | n-butylacrylate | 45 | 18500 | 26100 | 1.41 |
| comparison V3 | V1 | 3300 | 1.35 | styrene | 57 | 7800 | 10900 | 1.40 |
| E6 | E1 | 8700 | 1.50 | styrene | 59 | 20500 | 28500 | 1.39 |

The results in table 3 clearly show that the polymers (macroinitiators) prepared in the first step in the presence of a chain transfer agent (example E1) lead to higher yields and higher molecular weights when subjected to a second block copolymerisation with either n-butyl-acrylate or styrene as compared to the comparative macroinitiator (example V1).

EXAMPLES E7-E14

Polymerization is carried out as described for examples E1-E3 using n-butylacrylate and tert.-butylacrylate as monomers and compound 102 as nitroxylether. The thiol compound is 1-dodecylmercaptane or ethylhexylthioglycolate. The results are shown in Table 4 to 7.

TABLE 4

Influence of 1-dodecylmercaptane on the controlled polymerization of tert.-butylacrylate

| sample no. | nitroxylether mol % on monomer | thiol compound, mol % on monomer | yield (%) | $M_n$ (calc) | $M_n$ (GPC) | $M_w$ (GPC) | $M_w/M_n$ |
|---|---|---|---|---|---|---|---|
| comparison V4 | 1 | — | 33 | 4500 | 4300 | 6100 | 1.4 |
| E7 | 1 | 0.1 | 56 | 7500 | 8400 | 12400 | 1.5 |
| E8 | 1 | 0.25 | 67 | 8900 | 7600 | 11800 | 1.6 |

TABLE 5

Influence of ethylhexylthioglycolate on controlled polymerization of n-butylacrylate

| sample no. | nitroxylether mol % on monomer | thiol compound, mol % on monomer | Yield (%) | $M_n$ (calc) | $M_n$ (GPC) | $M_w$ (GPC) | $M_w/M_n$ |
|---|---|---|---|---|---|---|---|
| comparison V5 | 1 | — | 32 | 4300 | 4300 | 5400 | 1.2 |
| E9 | 1 | 0.25 | 49 | 6600 | 6200 | 8200 | 1.3 |
| E10 | 1 | 0.5 | 54 | 7300 | 6200 | 8400 | 1.4 |

TABLE 6

Influence of partial substitution of the nitroxylether by ethylhexylthioglycolate on controlled polymerization of tert.-butylacrylate

| sample no. | nitroxylether mol % on monomer | thiol compound, mol % on monomer | yield (%) | $M_n$ (calc) | $M_n$ (GPC) | $M_w$ (GPC) | $M_w/M_n$ |
|---|---|---|---|---|---|---|---|
| comparison V4 | 1 | — | 33 | 4500 | 4300 | 6100 | 1.4 |
| E11 | 0.8 | 0.2 | 63 | 10400 | 9700 | 13900 | 1.4 |
| E12 | 0.7 | 0.3 | 61 | 11500 | 10400 | 14900 | 1.4 |

TABLE 7

Influence of partial substitution of the nitroxylether by ethylhexylthioglycolate on controlled polymerization of n-butylacrylate

| sample no. | nitroxylether mol % on monomer | thiol compound, mol % on monomer | yield (%) | $M_n$ (calc) | $M_n$ (GPC) | $M_w$ (GPC) | $M_w/M_n$ |
|---|---|---|---|---|---|---|---|
| comparison V5 | 1 | — | 32 | 4300 | 4300 | 5400 | 1.2 |
| E13 | 0.8 | 0.2 | 70 | 11600 | 11000 | 13600 | 1.2 |
| E14 | 0.7 | 0.3 | 70 | 13100 | 10700 | 15800 | 1.5 |

In both sets of experiments, the replacement of a maximum amount of 30% (by mol) of nitroxyl ether still allows the controlled radical polymerization process to proceed with increased yield accompanied by a polydispersity value as low as measured for the reference sample.

Reinitiation Experiments using a Macroinitiator Prepared in the Presence of a Nitroxyl Ether without the Addition of a Chain Transfer Agent (examples E15-E17). Table 8

Preparation of the macroinitiator (V6).

The macroinitiator (V6) is synthesized using 1 mol % nitroxyl ether 101 in a 2 L autoclave at 120° C. The monomer, n-butylacrylate, is degassed by applying three consecutive vacuum-argon-flush cycles at room temperature, then the solution is heated rapidly to 120° C. while stirring. The nitroxyl ether, dissolved in 50 ml of monomer, is added at once when the final reaction temperature is reached. The polymerization is allowed to proceed for 6 hours. After polymerization the residual monomer is evaporated and the polymer dried in vacuo at 30° C. until constant weight is achieved. The macroinitiator V6 is a clear, slightly orange viscous polymer. The overall yield is 40%. Molecular weights are analyzed using SEC calibrated with polystyrene standards.

Reinitiation Experiments

In a 100 ml Schlenk tube, equipped with a magnetic stir bar, 10 g of V6 are dissolved in 50 g distilled monomer (as listed in the table) until the macroinitiator is completely dissolved. Then, calculated amounts of 1-dodecylmercaptane are added. Additionally, one experiment in each series is carried out without the thiol as a reference.

The tubes are degassed by three consecutive freeze-thaw-cycles and flushed with argon. Then they are immersed in an oil bath at 130° C. and the polymerization is allowed to proceed. After 6 hours, residual monomer is evaporated in vacuo and the polymer obtained dried at 30° C. in vacuo until constant weight is achieved. SEC analysis is performed on the crude reaction products.

TABLE 8

Reinitiation experiments with different concentrations of thiol added

| sample no. | added monomer | amount of thiol added (estimation based on C—O—N endgroups in macroinitiaor V6) | yield (%) of added monomer | $M_n$ | $M_w$ | $M_w/M_n$ |
|---|---|---|---|---|---|---|
| macroinitiator V6 | | | | 5500 | 7900 | 1.4 |
| comparison V7 | n-butylacrylate | | 24 | 12500 | 15400 | 1.2 |
| E15 | n-butylacrylate | 35 mg | 69 | 21700 | 31000 | 1.4 |
| E16 | n-butylacrylate | 70 mg | 72 | 20300 | 30700 | 1.5 |
| V8 | tert.-butylacrylate | — | 16 | 10600 | 13300 | 1.25 |
| E17 | tert.-butylacrylate | 70 mg | 66 | 18900 | 26000 | 1.4 |

From the data obtained it becomes evident that the concept of adding a chain transfer agent to the controlled polymerization of vinylic monomers in order to increase yield and molecular weight is not only valid for a homopolymerization step, but also for any reaction step in a multi-step polymerization procedure.

Table 9 shows the results of a second reinitiation step. For the formation of a third subsequent polymerization a polymer listed in Table 8 (E 15) was submitted to a consecutive polymerization routine without any additional thiol addition. SEC analysis proved the reinitiation ability of the polymer.

Multiple Reinitiation Experiments (Examples E18-E19)
Table 9

10 grams of the polymer E15 (n-butylacrylate/n-butylacrylate) synthesized in the presence of a chain transfer agent in the second polymerization step are added to 50 grams of pure monomer in a Schlenk tube, equipped with a magnetic stir bar and dissolved. The tubes are degassed by three consecutive freeze-thaw-cycles and flushed with argon. Then they are immersed in an oil bath at 130° C. and the polymerization is allowed to proceed. After 6 hours, residual monomer is evaporated in vacuo and the polymer obtained dried at 30° C. in vacuo until constant weight is achieved. SEC analysis is performed on the crude reaction products.

The molecular weight data prove that the third polymerization step is successful. Chain extension occurs, whilst maintaining molecular weight control.

TABLE 9

Reinitiation experiments using a polymer (macroinitiator) obtained in the presence of a chain transfer agent

| sample no. | Comonomer | yield (%) of added monomer | $M_n$ | $M_w$ | $M_w/M_n$ | initial polymer | final polymer |
|---|---|---|---|---|---|---|---|
| E15 | | | 21700 | 31000 | 1.4 | nBuA-nBuA | — |
| E18 | n-butylacrylate | 37 | 38700 | 62200 | 1.6 | nBuA-nBuA | nBuA-nBuA-nBuA |
| E19 | styrene | 64 | 60400 | 83700 | 1.4 | nBuA-nBuA | nBuA-nBuA-Sty |

Table 10 shows the color improvement of the final product when polymerization is carried out in the presence of a chain transfer agent.

Preparation of comparative example V10 is identical to the polymerization procedure as described before for n-butylacrylate in example E1-E3, with the exception that dicumylperoxide is used as initiator instead of nitroxyl ether (101) and no dodecylmercaptane is added.

TABLE 10

| sample | Dicumylperoxide, mol % on monomer | nitroxylether (101), mol % on monomer | dodecylmercaptane (mol %) on monomer | Yellowness Index 5 measurements and average value of 5 are given | | | | | |
|---|---|---|---|---|---|---|---|---|---|
| | | | | #1 | #2 | #3 | #4 | #5 | avg. |
| V1 | — | 1 | — | 7.27 | 6.58 | 6.52 | 5.32 | 4.56 | 6.05 |
| E1 | — | 1 | 0.1 | 4.7 | 4.41 | 4.53 | 4.42 | 4.27 | 4.47 |
| E2 | — | 1 | 0.25 | 3.95 | 3.7 | 3.66 | 3.79 | 3.57 | 3.73 |
| E3 | — | 0.8 | 0.2 | 3.83 | 3.51 | 3.61 | 3.56 | 3.78 | 3.66 |
| V10 | 1 | — | — | 3.47 | 3.37 | 3.37 | 3.44 | 3.39 | 3.41 |

YI values were measured with a Minolta Spectrophotometer CM 3600d.

The results in table 10 show that the Yellowness Index of the polymers prepared according to the present invention is reduced compared to the polymer obtained with the nitroxyl ether alone.

The invention claimed is:

1. A polymerizable composition, comprising
   a) at least one ethylenically unsaturated monomer or oligomer,
   b2) at least one stable free nitroxyl radical

and a free radical initiator and
   c) a chain transfer agent selected from the group consisting of a mercaptane and a thioether,
   wherein the nitroxyl radical of component b2) is of formula A', B' or O'

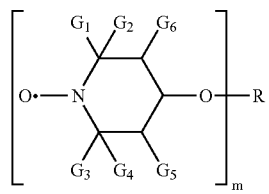 (A)'

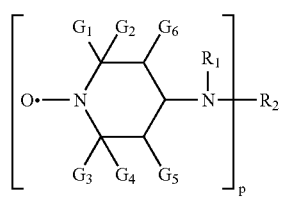 (B)'

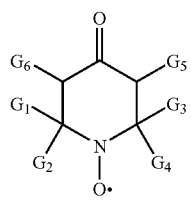 (O)' wherein
   m is 1,
   R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;
   p is 1;
   $R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;
   $R_2$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;
   $G_6$ is hydrogen and $G_5$ is hydrogen or $C_1$-$C_4$alkyl, and $G_1$ and $G_3$ are methyl and $G_2$ and $G_4$ are ethyl or propyl or $G_1$ and $G_2$ are methyl and $G_3$ and $G_4$ are ethyl or propyl.

2. A polymerizable composition, comprising
   a) a macroinitiator, which is an oligomer or polymer prepared in the presence of a nitroxyl radical and having attached to the oligomer/polymer backbone a nitroxyl group with the structural element

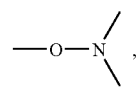

b) an ethylenically unsaturated monomer or oligomer and
   c) a chain transfer agent selected from the group consisting of a mercaptane, a thioether and a disulfide,
   wherein the structural element

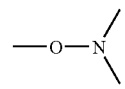

of the macroinitiator is derived from a compound of formulae A', B' or O'

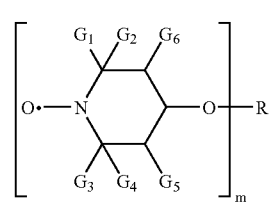 (A)'

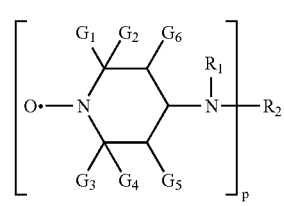 (B)'

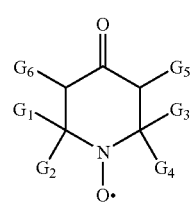 (O)' wherein
   m is 1,
   R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

p is 1;

$R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_2$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —$CH_2CH(OH)$-Z or of the formula —CO-Z or —CONH-Z wherein Z is hydrogen, methyl or phenyl;

$G_6$ is hydrogen and $G_5$ is hydrogen or $C_1$-$C_4$alkyl, and $G_1$ and $G_3$ are methyl and $G_2$ and $G_4$ are ethyl or propyl or $G_1$ and $G_2$ are methyl and $G_3$ and $G_4$ are ethyl or propyl.

3. A composition according to claim 1, wherein component c) is a compound of formula (IIa) or (IIb)

$R_{30}$—S—H (IIa)   $R_{30}$—S—$R_{30}$ (IIb)

wherein $R_{30}$ is $C_1$-$C_{18}$alkyl, $C_3$-$C_{18}$ alkenyl, $C_3$-$C_{18}$alkinyl, ($C_1$-$C_{18}$)alkyl-O—($C_1$-$C_{18}$alkylen)-, HO—($C_1$-$C_{18}$alkylen)-, ($C_1$-$C_{18}$alkyl)$_2$N—($C_1$-$C_{18}$alkylen)-, ($C_1$-$C_{18}$)alkyl-O—C(O)—($C_1$-$C_{18}$alkylen)-, phenyl, phenyl($C_1$-$C_3$alkyl), phenyl-C(O)— or ($C_1$-$C_{18}$alkyl)$_2$N—C(S)—.

4. A composition according to claim 3, wherein component c) is of formula (IIa) and $R_{30}$ is $C_8$-$C_{18}$alkyl.

5. A process for preparing an oligomer, a cooligomer, a polymer or a copolymer (block, random or graft) with a polydispersity of 1.1 to 2 by free radical polymerization of at least one ethylenically unsaturated monomer or oligomer, which comprises (co)polymerizing the monomer or monomers/oligomers in the presence of b2) at least one stable free nitroxyl radical

and a free radical initiator and c) a chain transfer agent selected from the group consisting of a mercaptane and a thioether.

6. A process for preparing a block (co)polymer with a polydispersity of 1.1 to 2 by free radical polymerization which comprises (co)polymerizing a) a macroinitiator, which is an oligomer or polymer prepared in the presence of a nitroxyl radical and having attached to the oligomer/polymer backbone a nitroxyl group with the structural element

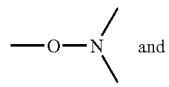   and b) an ethylenically unsaturated monomer or oligomer in the presence of c) a chain transfer agent selected from the group consisting of a mercaptane, a thioether and a disulfide; under reaction conditions capable of effecting scission of the O-polymer bond to form two free radicals, the polymer radical (macroinitiator) being capable of initiating polymerization.

7. A process according to claim 5, wherein the the nitroxyl radical of component b2) is present in an amount of from 0.001 mol-% to 20 mol-%, based on the monomer or monomer mixture.

8. A process according to claim 5, wherein the free radical initiator is present in an amount of 0.001 mol-% to 20 mol-%, based on the monomer or monomer mixture.

9. A process according to claim 6, wherein the scission of the O-polymer bond is effected by heating and takes place at a temperature of between 50° C. and 180° C.

10. A process according to claim 5, wherein the chain transfer agent, component c), is present in an amount of from 0.001 mol-% to 0.5 mol-%, based on the monomer or monomer mixture.

11. A composition according to claim 2, wherein component c) is a compound of formula (IIa), (IIb) or (IIc)

$R_{30}$—S—H (IIa)   $R_{30}$—S—$R_{30}$ (IIb)   $R_{31}$—S—S—$R_{31}$ (IIc)

wherein $R_{30}$ is $C_1$-$C_{18}$alkyl, $C_3$-$C_{18}$ alkenyl, $C_3$-$C_{18}$alkinyl, ($C_1$-$C_{18}$)alkyl-O—($C_1$-$C_{18}$alkylen)-, HO—($C_1$-$C_{18}$alkylen)-, ($C_1$-$C_{18}$alkyl)$_2$N—($C_1$-$C_{18}$alkylen)-, ($C_1$-$C_{18}$)alkyl-O—C(O)—($C_1$-$C_{18}$alkylen)-, phenyl, phenyl($C_1$-$C_3$alkyl), phenyl-C(O)— or ($C_1$-$C_{18}$alkyl)$_2$N—C(S)—; and $R_{31}$ is $C_1$-$C_{18}$alkyl, $C_3$-$C_{18}$alkenyl, $C_3$-$C_{18}$alkinyl, ($C_1$-$C_{18}$)alkyl-O—($C_1$-$C_{18}$alkylen)- or HO—($C_1$-$C_{18}$alkylen)-.

12. A composition according to claim 11, wherein component c) is of formula (IIa) and $R_{30}$ is $C_8$-$C_{18}$alkyl.

13. A process according to claim 6, wherein the chain transfer agent, component c), is present in an amount of from 0.001 mol-% to 0.5 mol-%, based on the monomer or monomer mixture.

14. A process according to claim 5, wherein the nitroxyl radical of component b2) is of formula A', B' or O'

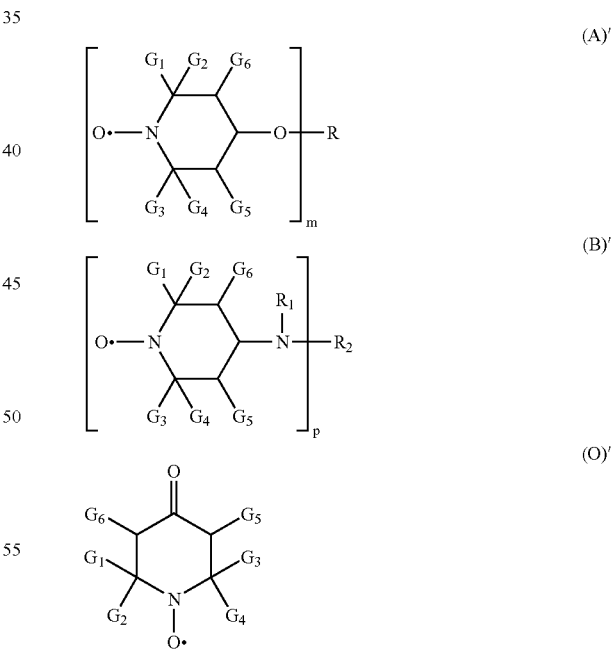

wherein m is 1,

R is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α, β-unsaturated carboxylic acid having 3 to 5 carbon atoms or of an aromatic carboxylic acid having 7 to 15 carbon atoms;

p is 1;

$R_1$ is $C_1$-$C_{12}$alkyl, $C_5$-$C_7$cycloalkyl, $C_7$-$C_8$aralkyl, $C_2$-$C_{18}$alkanoyl, $C_3$-$C_5$alkenoyl or benzoyl;

$R_2$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)-Z or of the formula —CO-Z or —CONH-Z wherein Z is hydrogen, methyl or phenyl;

$G_6$ is hydrogen and $G_5$ is hydrogen or $C_1$-$C_4$alkyl, and $G_1$ and $G_3$ are methyl and $G_2$ and $G_4$ are ethyl or propyl or $G_1$ and $G_2$ are methyl and $G_3$ and $G_4$ are ethyl or propyl.

15. A process according to claim 10, wherein the nitroxyl radical of component b2) is of formula (Ic'), (Id'), (Ie'), (If'), (Ig') or (Ih')

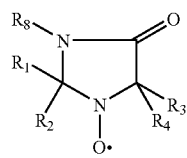
(Ic')

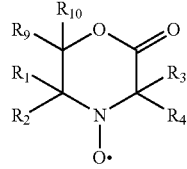
(Id')

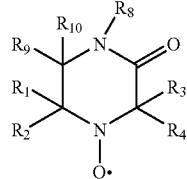
(Ie')

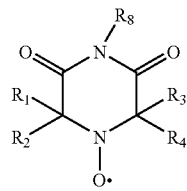
(If')

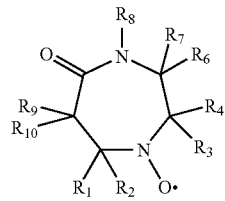
(Ig')

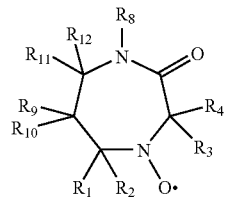
(Ih')

wherein $R_1$, $R_2$, $R_3$ and $R_4$ independently of each other are $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl or $R_1$ and $R_2$ and/or $R_3$ and $R_4$ together with the linking carbon atom form a $C_3$-$C_{12}$cycloalkyl radical;

$R_5$, $R_6$ and $R_7$ independently are hydrogen, $C_1$-$C_{18}$alkyl or $C_6$-$C_{10}$aryl;

$R_8$ is hydrogen, OH, $C_1$-$C_{18}$alkyl, $C_3$-$C_{18}$alkenyl, $C_3$-$C_{18}$alkinyl, $C_1$-$C_{18}$alkyl, $C_3$-$C_{18}$alkenyl, $C_3$-$C_{18}$alkinyl which are substituted by one or more OH, halogen or a group —O—C(O)—$R_5$, $C_2$-$C_{18}$alkyl which is interrupted by at least one O atom and/or $NR_5$ group, $C_3$-$C_{12}$cycloalkyl or $C_6$-$C_{10}$aryl, $C_7$-$C_9$phenylalkyl, $C_5$-$C_{10}$heteroaryl, —C(O)—$C_1$-$C_{18}$alkyl, —O—$C_1$-$C_{18}$alkyl or —COO$C_1$-$C_{18}$alkyl; and $R_9$, $R_{10}$, $R_{11}$ and $R_{12}$ are independently hydrogen, phenyl or $C_1$-$C_{18}$alkyl.

\* \* \* \* \*